(12) United States Patent
Onomura

(10) Patent No.: US 11,102,427 B2
(45) Date of Patent: Aug. 24, 2021

(54) IMAGING APPARATUS, IMAGE PROCESSING APPARATUS, IMAGE PROCESSING METHOD, AND RECORDING MEDIUM THAT RECORDS IMAGE PROCESSING PROGRAM

(71) Applicant: Olympus Corporation, Hachioji (JP)

(72) Inventor: Kenichi Onomura, Hino (JP)

(73) Assignee: Olympus Corporation, Tokyo (JP)

( * ) Notice: Subject to any disclaimer, the term of this patent is extended or adjusted under 35 U.S.C. 154(b) by 199 days.

(21) Appl. No.: 16/459,587

(22) Filed: Jul. 1, 2019

(65) Prior Publication Data

US 2019/0327429 A1 Oct. 24, 2019

Related U.S. Application Data

(63) Continuation of application No. PCT/JP2018/002751, filed on Jan. 29, 2018.

(30) Foreign Application Priority Data

Mar. 9, 2017 (JP) .............................. JP2017-044852

(51) Int. Cl.
*H04N 5/341* (2011.01)
*H04N 5/232* (2006.01)
*H04N 9/04* (2006.01)

(52) U.S. Cl.
CPC ............. *H04N 5/341* (2013.01); *H04N 5/232* (2013.01); *H04N 9/045* (2013.01)

(58) Field of Classification Search
CPC ......... H04N 5/341; H04N 5/232; H04N 9/045
See application file for complete search history.

(56) References Cited

U.S. PATENT DOCUMENTS 8,305,458 B2 * 11/2012 Hara ...................... H04N 9/045
348/222.1
2005/0094007 A1 * 5/2005 Nomura ............. H04N 9/04515
348/272

(Continued)

FOREIGN PATENT DOCUMENTS

| JP | 2008-199177 A | 8/2008 |
| JP | 2012-009919 A | 1/2012 |
| WO | WO 2014/136570 A1 | 9/2014 |

OTHER PUBLICATIONS

English translation of the PCT International Preliminary Report on Patentability from corresponding International Application No. PCT/JP2018/002751, dated Sep. 19, 2019 (6 pgs.).

(Continued)

*Primary Examiner* — Georgia Y Epps
*Assistant Examiner* — Don J Williams
(74) *Attorney, Agent, or Firm* — John C. Pokotylo; Pokotylo Patent Services

(57) ABSTRACT

An imaging apparatus includes a solid-state image sensor with Bayer array structure. The imaging apparatus includes a calculation circuit, an interpolation operating circuit, and a G-step detecting circuit. The calculation circuit calculates a first value and a second value, for each predetermined image area of image data output from the solid-state image sensor. The first value is a mean value or integrated value of pixel values of first green pixels. The second value is a mean value or integrated value of pixel values of second green pixels. The interpolation operating circuit performs, for a plurality of the image areas, an interpolation operation by using a plurality of the first values and a plurality of the second values.

15 Claims, 11 Drawing Sheets

(56) References Cited

U.S. PATENT DOCUMENTS

2008/0193049 A1 8/2008 Onomura
2015/0326838 A1 11/2015 Kawai et al.

OTHER PUBLICATIONS

International Search Report from corresponding International Application No. PCT/JP2018/002751, dated Apr. 3, 2018 (2 pgs.), with translation (1 pg.).

* cited by examiner

|    |    |    |    |    |    |    |    |    |    |
|----|----|----|----|----|----|----|----|----|----|
| Gr | R  | Gr | R  | Gr | R  | Gr | R  | Gr | R  |
| B  | Gb | B  | Gb | B  | Gb | B  | Gb | B  | Gb |
| Gr | R  | Gr | R  | Gr | R  | Gr | R  | Gr | R  |
| B  | Gb | B  | Gb | B  | Gb | B  | Gb | B  | Gb |
| Gr | R  | Gr | R  | Gr | R  | Gr | R  | Gr | R  |
| B  | Gb | B  | Gb | B  | Gb | B  | Gb | B  | Gb |
| Gr | R  | Gr | R  | Gr | R  | Gr | R  | Gr | R  |
| B  | Gb | B  | Gb | B  | Gb | B  | Gb | B  | Gb |
| Gr | R  | Gr | R  | Gr | R  | Gr | R  | Gr | R  |
| B  | Gb | B  | Gb | B  | Gb | B  | Gb | B  | Gb |

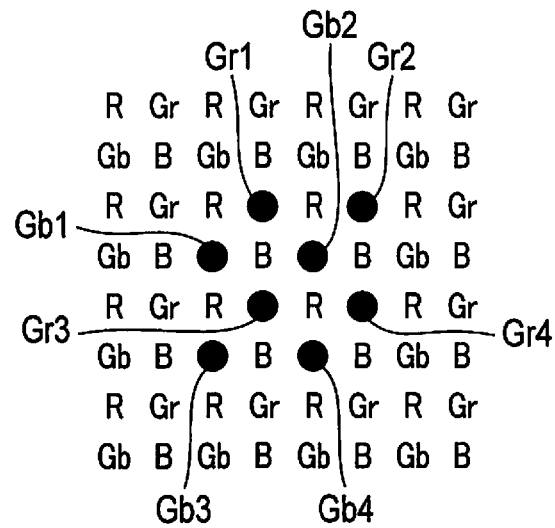
F I G. 11
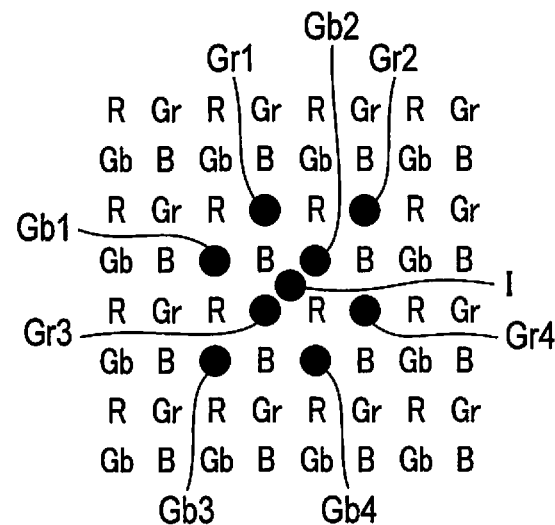
F I G. 12

IMAGING APPARATUS, IMAGE PROCESSING APPARATUS, IMAGE PROCESSING METHOD, AND RECORDING MEDIUM THAT RECORDS IMAGE PROCESSING PROGRAM

CROSS-REFERENCE TO RELATED APPLICATIONS

This application is a Continuation Application of PCT Application No. PCT/JP2018/002751, filed Jan. 29, 2018 and based upon and claiming the benefit of priority from the prior Japanese Patent Application No. 2017-044852, filed Mar. 9, 2017, the entire contents of both of which are incorporated herein by reference.

FIELD

The present embodiment relates to an imaging apparatus, an image processing apparatus, an image processing method, and a recording medium that records an image processing program.

BACKGROUND

In the field of imaging apparatuses such as digital cameras, it is known that a phenomenon called a ghost may occur. The ghost occurs with ghost light, such as light internally reflected in a lens, imaged by an image sensor. In particular, the ghost, which occurs in an imaging apparatus having an image sensor with Bayer array structure, causes false color.

When the ghost occurs in an imaging apparatus having an image sensor with Bayer array structure, a difference occurs between the pixel value of a Gr pixel and the pixel value of a Gb pixel that should be originally the same level. The presence or absence of the ghost can be determined from this difference between the pixel value of a Gr pixel and the pixel value of a Gb pixel. In addition, in the imaging apparatus disclosed in Jpn. Pat. Appln. KOKAI Publication No. 2012-9919, the presence or absence of the ghost is determined from the difference between the mean value of the pixel values of Gr pixels and the mean value of the pixel values of Gb pixels. The difference between the pixel value of a Gr pixel and that of a Gb pixel, which occurs due to the structure (edge structure) of a fine subject, can be suppressed by calculating the mean value.

In an image sensor with Bayer array structure, a Gr pixel and a Gb pixel are arranged at different positions. Therefore, the center of gravity represented by the mean value of the pixel values of Gr pixels and the center of gravity represented by the mean value of the pixel values of Gb pixels do not match each other. Therefore, the difference between the pixel value of a Gr pixel and the pixel value of a Gb pixel, which occurs due to an edge structure depending on the structure of a subject, cannot be suppressed just by calculating the mean values.

The present invention has been made in view of the above circumstance, and an object of the invention is to provide an imaging apparatus, an image processing apparatus, an image processing method, and a recording medium that records an image processing program, which can accurately detect a ghost by eliminating an influence of the structure of a subject.

SUMMARY

An imaging apparatus according to a first aspect includes a solid-state image sensor with Bayer array structure. The Bayer array structure includes a first line and a second line. In the first line, red pixels and first green pixels are alternately arranged in a horizontal direction. In the second line, blue pixels and second green pixels are alternately arranged in the horizontal direction. The first line and second line are alternately arranged in a vertical direction. The imaging apparatus includes a calculation circuit, an interpolation operating circuit, and a G-step detecting circuit. The calculation circuit calculates a first value and a second value, for each predetermined image area of image data output from the solid-state image sensor. The first value is a mean value or integrated value of pixel values of the first green pixels. The second value is a mean value or integrated value of pixel values of the second green pixels. The interpolation operating circuit performs, for a plurality of the image areas, an interpolation operation by using the first values and the second values such that a first center of gravity represented by each of the first values and a second center of gravity represented by each of the second values match each other. The G-step detecting circuit calculates a difference between the first value and the second value interpolated.

An image processing apparatus according to a second aspect includes a calculation circuit, an interpolation operating circuit, and a G-step detecting circuit. The calculation circuit calculates a first value and a second value, for each predetermined image area of image data output from a solid-state image sensor with Bayer array structure. The Bayer array structure includes a first line and a second line. In the first line, red pixels and first green pixels are alternately arranged in a horizontal direction. In the second line, blue pixels and second green pixels are alternately arranged in the horizontal direction. The first line and second line are alternately arranged in a vertical direction. The interpolation operating circuit performs, for a plurality of the image areas, an interpolation operation by using the first values and the second values such that a first center of gravity represented by each of the first values and a second center of gravity represented by each of the second values match each other. The G-step detecting circuit calculates a difference between the first value and the second value interpolated.

An image processing method according to a third aspect including calculating a first value and a second value, for each predetermined image area of image data output from a solid-state image sensor with Bayer array structure in which a line, where red pixels and first green pixels are alternately arranged in a horizontal direction, and a line, where blue pixels and second green pixels are alternately arranged in the horizontal direction, are alternately arranged in a vertical direction, the first value being a mean value or integrated value of pixel values of the first green pixels and the second value being a mean value or integrated value of pixel values of the second green pixels; performing an interpolation operation by using a plurality of the first values and a plurality of the second values calculated for a plurality of the image areas such that a first center of gravity represented by each of the first values and a second center of gravity represented by each of the seconds match each other; and calculating a difference between the first value and the second value interpolated by the interpolation operation.

A computer readable recording medium according to a fourth aspect records an image processing program. The image processing program causes a computer to execute: calculating a first value and a second value, for each predetermined image area of image data output from a solid-state image sensor with Bayer array structure in which a line, where red pixels and first green pixels are alternately arranged in a horizontal direction, and a line, where blue pixels and second green pixels are alternately arranged in the horizontal direction, are alternately arranged in a vertical direction, the first value being a mean value or integrated value of pixel values of the first green pixels and a second value being a mean value or integrated value of pixel values of the second green pixels; performing an interpolation operation by using a plurality of the first values and a plurality of the second values calculated for a plurality of the image areas such that a first center of gravity represented by each of the plurality of the first values and a second center of gravity represented by each of the plurality of the second values match each other; and calculating a difference between the first value and the second value interpolated by the interpolation operation.

Advantages of the embodiments will be set forth in the description which follows, and in part will be obvious from the description, or may be learned. The advantages may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments, and together with the general description given above and the detailed description of the embodiments given below, serve to explain the principles.

FIG. 2 is a view illustrating division of image data in one embodiment.

FIG. 3 is a view illustrating a positional relationship among centers of gravity Gr1, Gb1, Gr2, and Gb2.

FIG. 10A is a view illustrating a positional relationship among four image areas when division is performed with four patterns.

FIG. 10B is a view illustrating a positional relationship among four image areas when division is performed with four patterns.

FIG. 11 is a view illustrating a positional relationship among eight centers of gravity represented by first values and second values obtained in the four image areas.

FIG. 12 is a view illustrating movements of the centers of gravity after an interpolation operation is performed in FIG. 11.

DETAILED DESCRIPTION

Figure 1:
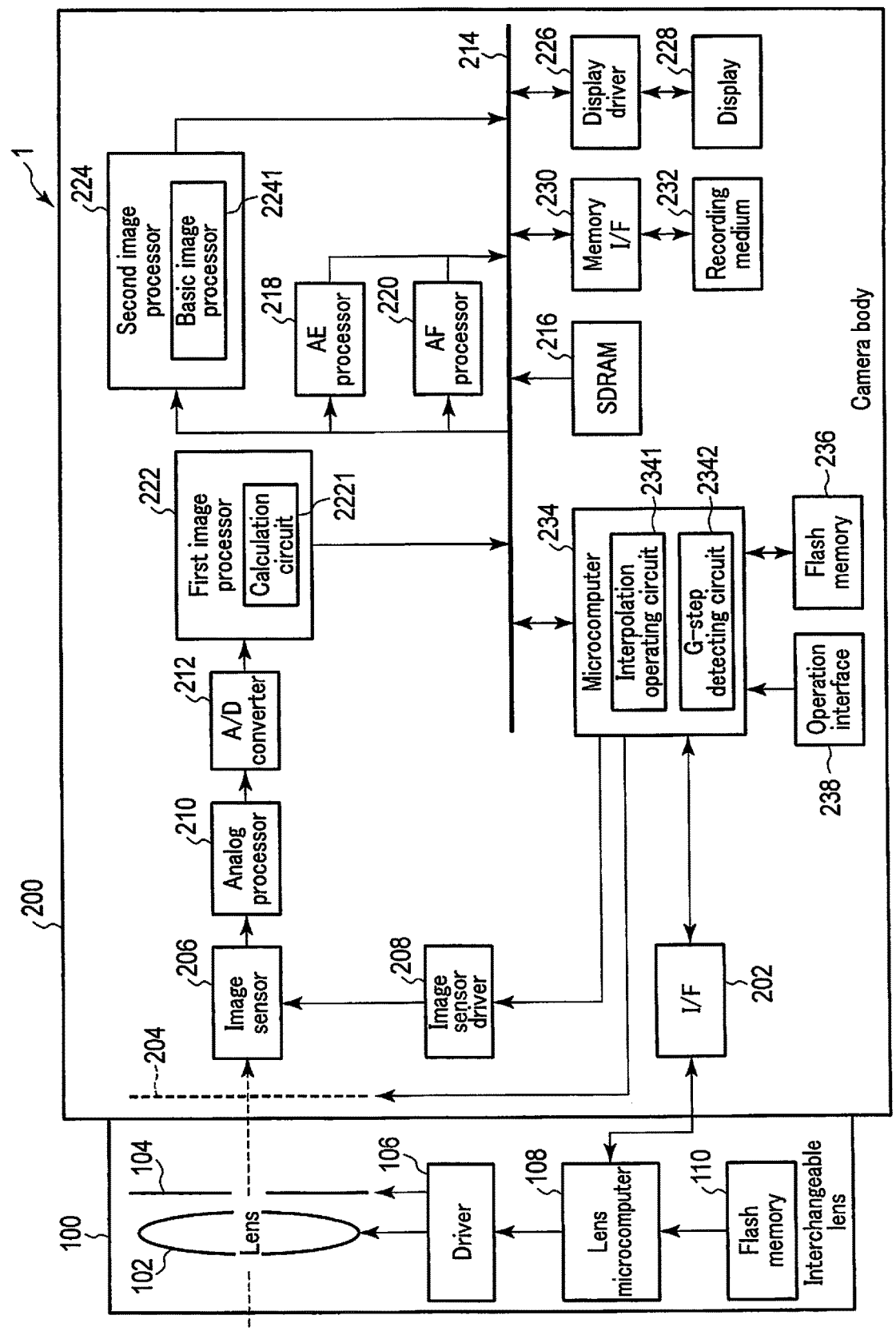
FIG. 1 is a block diagram illustrating a configuration of one example of a camera system as one example of an imaging apparatus according to one embodiment.

Hereinafter, embodiments of the present invention will be described with reference to the drawings. FIG. 1 is a block diagram illustrating a configuration of a camera system as one example of an imaging apparatus according to one embodiment of the present invention. A camera system 1 illustrated in FIG. 1 includes an interchangeable lens 100 and a camera body 200. The interchangeable lens 100 is configured to be attached to and detached from the camera body 200. When the interchangeable lens 100 is attached to the camera body 200, the interchangeable lens 100 and the camera body 200 are communicably connected to each other. The camera system 1 does not necessarily have to be a lens-interchangeable camera system. The camera system 1 may be, for example, a lens-integrated camera system.

The interchangeable lens 100 includes an imaging lens 102, an aperture 104, a driver 106, a lens microcomputer 108, and a flash memory 110.

The imaging lens 102 is an optical system for imaging a light flux from a subject on the image sensor 206 of the camera body 200. The imaging lens 102 has one or more lenses including a focus lens. The imaging lens 102 may include a zoom lens. The aperture 104 is arranged on the optical axis of the imaging lens 102, and is configured such that its diameter is variable. The aperture 104 regulates a light flux from a subject that passes through the imaging lens 102 to enter the image sensor 206. The driver 106 drives the focus lens of the imaging lens 102 and drives the aperture 104, based on a control signal from the lens microcomputer 108.

The lens microcomputer 108 is configured to be communicable with a microcomputer 234 of the camera body 200 via an interface (I/F) 202 provided in the camera body 200. This lens microcomputer 108 controls, under the control of the microcomputer 234, the driver 106 in accordance with a program stored in the flash memory 110. The lens microcomputer 108 also transmits various types of information stored in the flash memory 110 via an I/F 202, such as lens information, to the microcomputer 234. The lens microcomputer 108 does not necessarily have to be configured as a microcomputer, and may be configured by an ASIC (application specific integrated circuit), a FPGA (field-programmable gate array), or the like.

The flash memory 110 stores programs required for the operation of the interchangeable lens 100. The flash memory 110 also stores lens information on the interchangeable lens 100. The lens information includes, for example, information on the focal length of the imaging lens 102 and information on aberration.

The camera body 200 has the I/F 202, a shutter 204, the image sensor 206, an image sensor driver 208, an analog processor 210, an analog-to-digital (A/D) converter 212, a bus 214, an SDRAM (Synchronous Dynamic Random Access Memory) 216, an AE processor 218, an AF processor 220, a first image processor 222, a second image processor 224, a display driver 226, a display 228, a memory interface (I/F) 230, a recording medium 232, the microcomputer 234, a flash memory 236, and an operation interface 238. Each block of the camera body 200 is configured, for example, by hardware. However, it does not necessarily have to be configured by hardware, and may be configured by software. In addition, each block of the camera body 200 may not be configured by single hardware or software, and may be configured by a plurality of hardware or software.

The shutter 204 is configured to be freely opened and closed. The shutter 204 adjusts the incidence time of a light flux from a subject into the image sensor 206 (the exposure time of the image sensor 206). For example, a focal-plane shutter is adopted as the shutter 204. The shutter 204 is driven based on a control signal from the microcomputer 234.

The image sensor 206 is arranged at a position that is on the optical axis of the imaging lens 102 and is behind the shutter 204, and at which a light flux from a subject forms an image by the imaging lens 102. The image sensor 206 is a solid-state image sensor having a color filter with Bayer array structure. The Bayer array structure means an array structure of a color filter in which a line, where R (red) pixels and Gr (first green) pixels are alternately arranged in the horizontal direction, and a line, where B (blue) pixels and Gb (second green) pixels are alternately arranged in the horizontal direction, are alternately arranged in the vertical direction. Such an image sensor 206 generates an image signal by imaging a subject field. The image sensor driver 208 drives the image sensor 206. The image sensor driver 208 also controls reading of an image signal generated by the image sensor 206.

The analog processor 210 performs analog processing, such as amplification processing, on the image signal read from the image sensor 206. The A/D converter 212 converts the image signal output from the analog processor 210 into digital-format image data.

The bus 214 is connected to the A/D converter 212, the SDRAM 216, the AE processor 218, the AF processor 220, the first image processor 222, the second image processor 224, the display driver 226, and the memory I/F 230, and operates as a transfer path for transferring the various data generated in these blocks.

The SDRAM 216 is an electrically rewritable memory. The SDRAM 216 temporarily stores various data such as the image data output from the A/D converter 212, the first image processor 222, or the second image processor 224 and the processed data in the AE processor 218, the AF processor 220, or the microcomputer 234. Alternatively, a DRAM (Dynamic Random Access Memory) may be adopted for temporary storage.

The AE processor 218 performs automatic exposure (AE) processing. Specifically, the AE processor 218 sets imaging conditions (aperture value and shutter speed value) based on an AE evaluation value representing a subject brightness in the image data.

The AF processor 220 performs automatic focus adjustment (AF) processing. Specifically, the AF processor 220 controls the drive of a focus lens included in the imaging lens 102, based on focal information obtained from the image data or the like. The focal information is an AF evaluation value (contrast value) calculated, for example, from the image data. When the image sensor 206 has a focus detection pixel, the focal information may be a defocus amount calculated from an output of the focus detection pixel.

The first image processor 222 performs image processing for obtaining information required for performing basic processing for imaging, such as obtaining of the AE evaluation value for AE processing, the AF evaluation value for AF processing, and information for calculating a white balance gain in AWB (auto white balance mode). The AE evaluation value can be obtained by calculating, for example, the mean value or integrated value of the pixel values of the same color pixels of image data for each predetermined image area. The AF evaluation value can be obtained by calculating, for example, the integrated value of the high frequency components for each predetermined image area (this image area may or may not match the image area for calculating the AE evaluation value) of the image data extracted by HPF (high pass filter) processing. The information for calculating the white balance gain can be obtained by calculating, for example, the mean value or integrated value of the pixel values of the same color pixels of image data for each predetermined image area and by using the spectral transmittance characteristics of the imaging lens 102, the spectral sensitivity characteristics of the image sensor 206, and the like.

The first image processor 222 in the present embodiment includes a calculation circuit 2221. The calculation circuit 2221 calculates, for each predetermined image area of image data, a first value that is the mean value or integrated value of the pixel values of Gr pixels and a second value that is the mean value or integrated value of the pixel values of Gb pixels. The first value and the second value calculated by the calculation circuit 2221 are used for the later-described ghost determination. In calculating the AE evaluation value or the white balance gain in AWB, processing for calculating the mean value or integrated value of pixel values is also performed as described above. Therefore, a calculation circuit for calculating the AE evaluation value or the white balance gain in AWB may double as the calculation circuit 2221. Of course, the calculation circuit 2221 may be provided separately from the calculation circuit for calculating the AE evaluation value or the white balance gain in AWB.

The second image processor 224 includes a basic image processor 2241. The basic image processor 2241 performs basic image processing required for displaying or recording an image on image data. This basic image processing includes, for example, optical black (OB) subtraction processing, white balance (WB) correction processing, demosaic processing, color conversion processing, gamma conversion processing, noise reduction processing, scaling processing, and compression processing. The basic image processor 2241 of the second image processor 224 may be further configured to perform image processing for ghost cancellation. As the image processing for ghost cancellation, processing is cited, in which the pixel value of a pixel where a ghost occurs is interpolated, for example, by using the pixel values of the surrounding pixels of the same color. An image processor for ghost cancellation may be provided separately from the basic image processor 2241.

The display driver 226 drives the display 228 to make the display 228 display an image based on the image data processed by the second image processor 224. The display 228 is a display such as, for example, a liquid crystal display or an organic EL display. The display 228 is arranged, for example, on the rear surface of the camera body 200. The display 228 is driven by the display driver 226 to display various images. The display 228 does not necessarily have to be provided in the camera body 200. The display 228 may be, for example, a TV monitor, a monitor display, or the like that is communicably connected to the camera body 200.

The memory I/F 230 mediates the data transfer from the recording medium 232 to the bus 214 and from the bus 214 to the recording medium 232. The recording medium 232 is, for example, a flash memory. The recording medium 232 is configured to be built in or loaded into the camera body 200. The recording medium 232 records the image data processed by the second image processor 224 as an image file of a predetermined format.

The microcomputer 234 is a controller that controls each block of the camera body 200 in accordance with the programs stored in the flash memory 236. The microcomputer 234 does not necessarily have to be configured as a microcomputer, and may be configured by an ASIC, an FPGA, or the like.

The microcomputer 234 in the present embodiment includes an interpolation operating circuit 2341 and a G-step detecting circuit 2342. The interpolation operating circuit 2341 performs an interpolation operation by using the first value and the second value calculated by the calculation circuit 2221 such that the center of gravity represented by the first value and the center of gravity represented by the second value match each other. The G-step detecting circuit 2342 determines the presence or absence of a ghost by calculating a G-step that is the difference between the first value and the second value interpolated by the interpolation operating circuit 2341. The details of the interpolation operating circuit 2341 and the G-step detecting circuit 2342 will be described later.

The flash memory 236 stores programs required for the operation of the camera body 200. The flash memory 236 also stores information required for various processing of the camera body 200. This information includes, for example, information on the parameters of image processing.

The operation interface 238 includes various operation members such as: various operation buttons including a power button for turning on and off the power supply of the camera body 200, a release button for generating a trigger signal that directs a still image to be imaged, a movie start button for starting recording of a movie image, a movie end button for ending recording of a movie image, a play button that directs an imaged and recorded still image or to be played, and a menu button that directs the change or setting of various setting values and modes of the camera body 200; and a touch panel that performs functions similar to the operations of the various operation buttons. The operation interface 238 detects the operation states of the various operation members, and outputs a signal representing a detection result to the microcomputer 234.

Figures 2, 3:
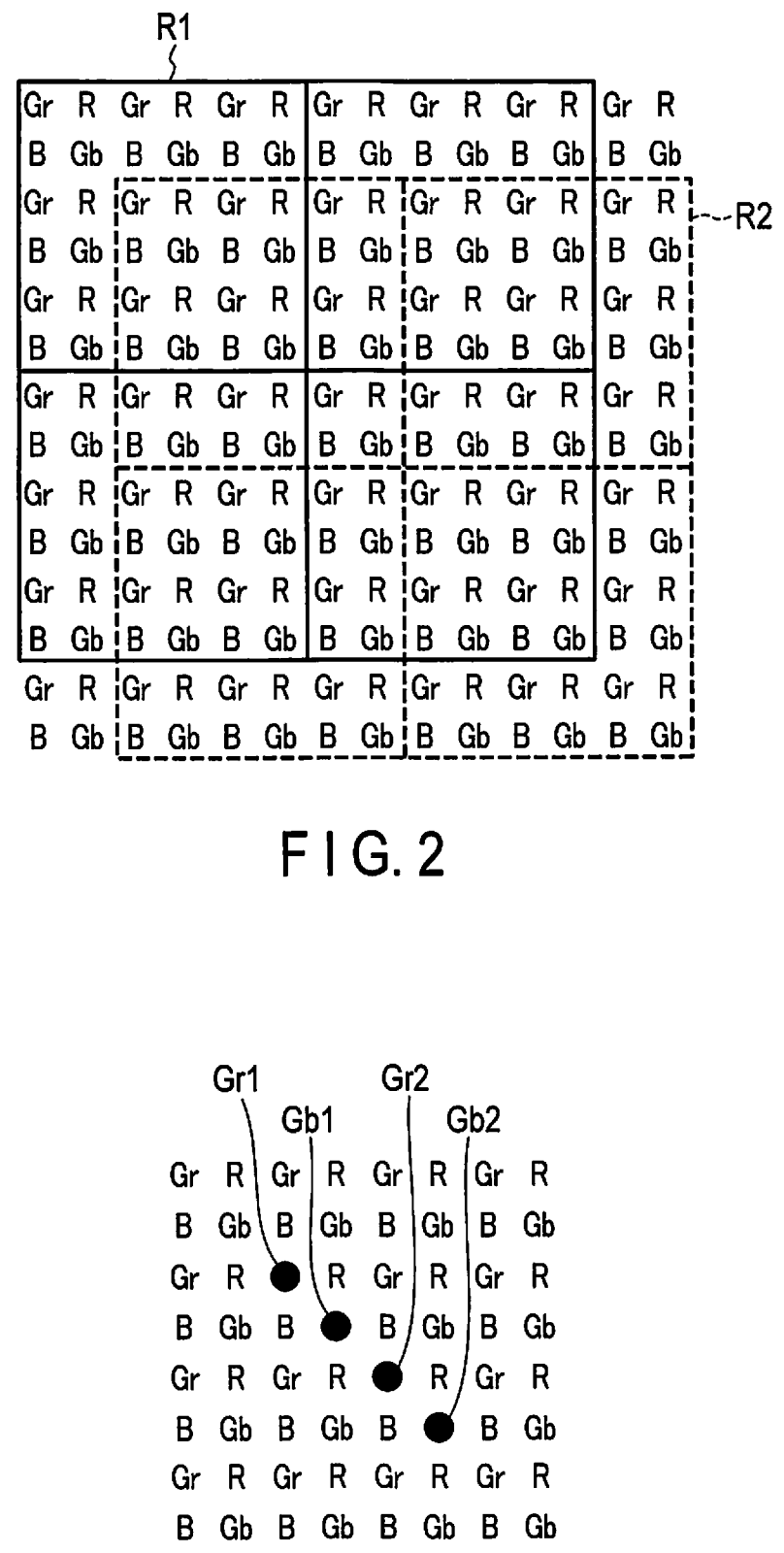

Next, a basic concept of the ghost determination in the present embodiment will be described. In determining a ghost, the calculation circuit 2221 first divides the image data obtained via the image sensor 206 into a plurality of image areas with a first pattern in the present embodiment. The calculation circuit 2221 divides, for example, the image data into units each having an image area R1 of 6 pixels×6 pixels, as illustrated in FIG. 2. Herein, the size of the image area R1 may be appropriately set, and does not necessarily have to be 6 pixels×6 pixels. In FIG. 2, the head color (the color of the upper left end pixel) of the image area R1 is Gr, but the head color of the image area R1 may not be Gr. After the division with the first pattern, the calculation circuit 2221 calculates, for each image area R1, the mean value or integrated value (first value) of the pixel values of Gr pixels and the mean value or integrated value (second value) of the pixel values of Gb pixels.

Then, the calculation circuit 2221 divides the image data into a plurality of image areas with a second pattern. In the second pattern, the calculation circuit 2221 divides the image data into units each having an image area R2 that has the same size and color arrangement as the image area R1 and that is located at a different position from the image area R1. The calculation circuit 2221 divides, for example, the image data into units each having the image area R2 that is located at a position shifted from the image area R1 by 2 pixels in each of the horizontal and vertical directions to the lower right direction, as illustrated in FIG. 2. The shift amount does not necessarily have to be 2 pixels, and may be 4 pixels, 6 pixels, or the like. However, as the image area R1 and the image area R2 are located nearer to each other, an influence of the structure of a subject can be further suppressed in performing the ghost determination. Therefore, it is desirable that the image data is divided such that the image area R2 is shifted from the image area R1 by the minimum number of pixels, i.e., by 2 pixels. After the division with the second pattern, the calculation circuit 2221 calculates, for each image area R2, the mean value or integrated value (first value) of the pixel values of Gr pixels and the mean value or integrated value (second value) of the pixel values of Gb pixels.

The first value for the image area R1 is the mean value or integrated value of the pixel values of Gr pixels in the image area R1. Therefore, it can be considered that the first value for the image area R1 is a value at the center of gravity of the Gr pixels in the image area R1. Similarly, it can be considered that: the second value for the image area R1 is a value at the center of gravity of the Gb pixels in the image area R1; the first value for the image area R2 is a value at the center of gravity of the Gr pixels in the image area R2; and the second value for the image area R2 is a value at the center of gravity of the Gb pixels in the image area R2. The positional relationship among these four centers of gravity is as illustrated in FIG. 3. As illustrated in FIG. 3, a center of gravity Gr1 represented by the first value for the image area R1 is shifted from a center of gravity Gb1 represented by the second value for the image area R1. Similarly, a center of gravity Gr2 represented by the first value for the image area R2 is shifted from a center of gravity Gb2 represented by the second value for the image area R2. Due to the shifts between these centers of gravity, a difference may be caused between the first value and the second value due to an influence of the structure of a subject. The larger the shift between the centers of gravity, the larger an influence of the structure of a subject. If the difference is caused due to an influence of the structure of a subject, it may lead to incorrect ghost determination.

So, an interpolation operation is performed in the present embodiment by using the first value and the second value for the image area R1 and the first value and the second value for the image area R2 such that the center of gravity represented by the first value and the center of gravity represented by the second value match each other. Specifically, the interpolation operating circuit 2341 performs the following (Equation 1) operations:

$$Igr = (1 \times Vgr1 + 3 \times Vgr2)/4;$$

$$Igb = (3 \times Vgb1 + 1 \times Vgb2)/4 \qquad \text{(Equation 1)}$$

Herein, Igr is a first value (a first interpolated value) after the interpolation operation, Vgr1 is the first value for the image area R1, and Vgr2 is the first value for the image area R2. Igb is a second value (a second interpolated value) after the interpolation operation, Vgb1 is the second value for the image area R1, and Vgb2 is the second value for the image area R2.

Figure 4:
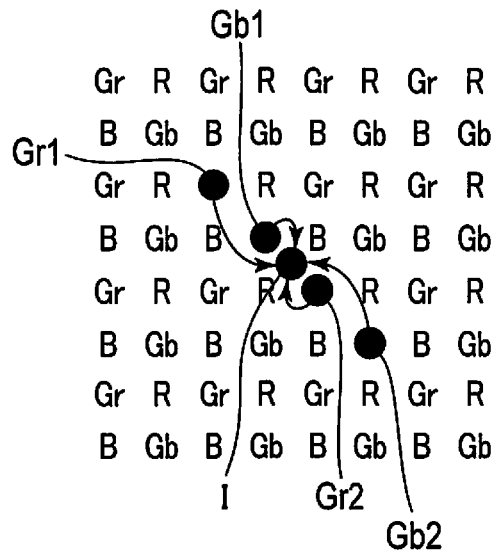
FIG. 4 is a view illustrating movements of the centers of gravity after an interpolation operation is performed in FIG. 3.

FIG. 4 is a view illustrating movements of the centers of gravity after the interpolation operations are performed. The position (interpolated position) represented by the first interpolated value Igr obtained by the interpolation operation shown in (Equation 1) is the position of I in FIG. 4. Similarly, the position (interpolated position) represented by the second interpolated value Igb obtained by the interpolation operation shown in (Equation 1) is also the position of I in FIG. 4. That is, the center of gravity represented by the first interpolated value and the center of gravity represented by the second interpolated value match each other. When the positions of the centers of gravity match each other, the influences of the structure of a subject in the Gr pixel and Gb pixel become the same. Thereby, ghost determination can be performed correctly.

After the interpolation operating circuit 2341 performs the interpolation operation, the G-step detecting circuit 2342 calculates a difference (a G-step) between the first interpolated value Igr and the second interpolated value Igb that are obtained by the interpolation operation. If the Gr pixel and the Gb pixel are not influenced by the structure of a subject, the pixel values of the Gr pixel and the Gb pixel located close to each other are usually almost the same. Therefore, the G-step, the difference between the first value that is the mean value or integrated value of Gr pixels and the second value that is the mean value or integrated value of Gb pixels, becomes small. On the other hand, when ghost light enters the image sensor 206, a big difference occurs between the pixel value of a Gr pixel and the pixel value of a Gb pixel. Therefore, the G-step, the difference between the first value that is the mean value or integrated value of Gr pixels and the second value that is the mean value or integrated value of Gb pixels, also becomes large. From such a relationship, the presence or absence of a ghost can be determined by the size of the G-step.

In the example of FIG. 2, the image area R2 is shifted from the image area R1 by 2 pixels in each of the horizontal and vertical directions to the lower right direction. This is because the center of gravity Gb1 represented by the second value is shifted from the center of gravity Gr1 represented by the first value to the lower right direction. The direction to which the image area R2 is to be shifted needs to be changed depending on the head color of the image area R1.

Figure 5:
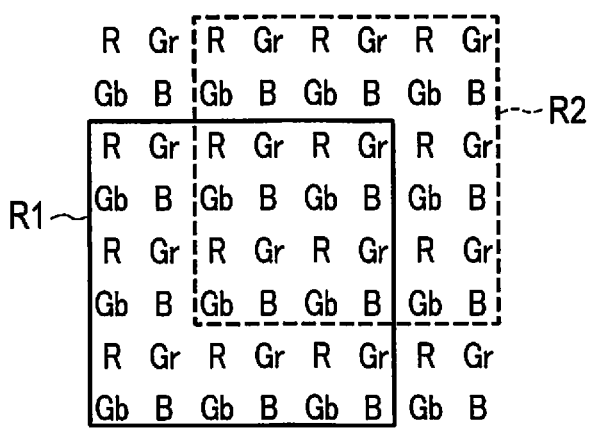
FIG. 5 is a view illustrating how to shift an image area R2 when the head color of an image area R1 is R.

FIG. 5 is a view illustrating how to shift the image area R2 when the head color of the image area R1 is R. When the head color of the image area R1 is R, the center of gravity Gb1 represented by the second value is shifted from the center of gravity Gr1 represented by the first value in the image area R1 to the upper right direction. Therefore, if the image area R2 is shifted from the image area R1 to the lower right direction, the centers of gravity Gr1, Gb1, Gr2, and Gb2 are not aligned on the same straight line. In this case, the centers of gravity cannot be matched each other by the interpolation operations. In order that the centers of gravity Gr1, Gb1, Gr2, and Gb2 are aligned on the same straight line when the head color of the image area R1 is R, the image area R2 may be located at a position shifted from the image area R1 by 2 pixels in each of the horizontal and vertical directions to the upper right direction, as illustrated in FIG. 5. Generally, when the head color of the image area R1 is Gr or Gb, the image area R2 may be located at a position shifted to the lower right (upper left) direction, and when the head color of the image area R1 is R or B, the image area R2 may be located at a position shifted to the upper right (lower left) direction.

Figure 6:
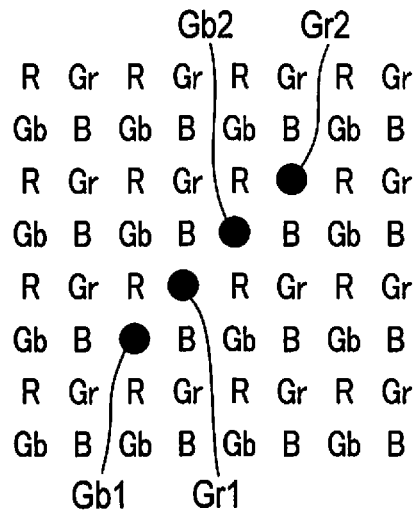
FIG. 6 is a view illustrating a positional relationship among centers of gravity Gr1, Gb1, Gr2, and Gb2, when the head color of the image area R1 is R and when the image area R2 is created by shifting the image area R1 by 2 pixels in each of the horizontal and vertical directions to the upper right direction.

FIG. 6 is a view illustrating the positional relationship among the centers of gravity Gr1, Gb1, Gr2, and Gb2, when the head color of the image area R1 is R and when the image area R2 is located at a position shifted from the image area R1 by 2 pixels in each of the horizontal and vertical directions to the upper right direction. The centers of gravity Gr1, Gb1, Gr2, and Gb2 are aligned on the same straight line by shifting the image area R2 from the image area R1 to the upper right direction. When the centers of gravity Gr1, Gb1, Gr2, and Gb2 have a positional relationship as illustrated in FIG. 6, the interpolation operating circuit 2341 performs the following (Equation 2) operations:

$$Igr=(3\times Vgr1+1\times Vgr2)/4$$

$$Igb=(1\times Vgb1+3\times Vgb2)/4 \quad \text{(Equation 2)}$$

Figure 7:
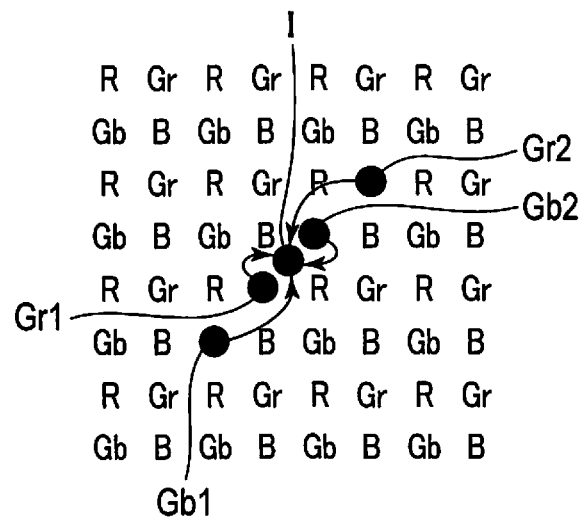
FIG. 7 is a view illustrating movements of the centers of gravity after an interpolation operation is performed in FIG. 6.

FIG. 7 is a view illustrating movements of the centers of gravity after the interpolation operations are performed in FIG. 6. The position (interpolated position) represented by the first interpolated value Igr obtained by the interpolation operation shown in (Equation 2) is the position of I in FIG. 7. Similarly, the position (interpolated position) represented by the second interpolated value Igb obtained by the interpolation operation shown in (Equation 2) is also the position of I in FIG. 7. That is, the center of gravity represented by the first interpolated value and the center of gravity represented by the second interpolated value match each other.

Figure 8A:
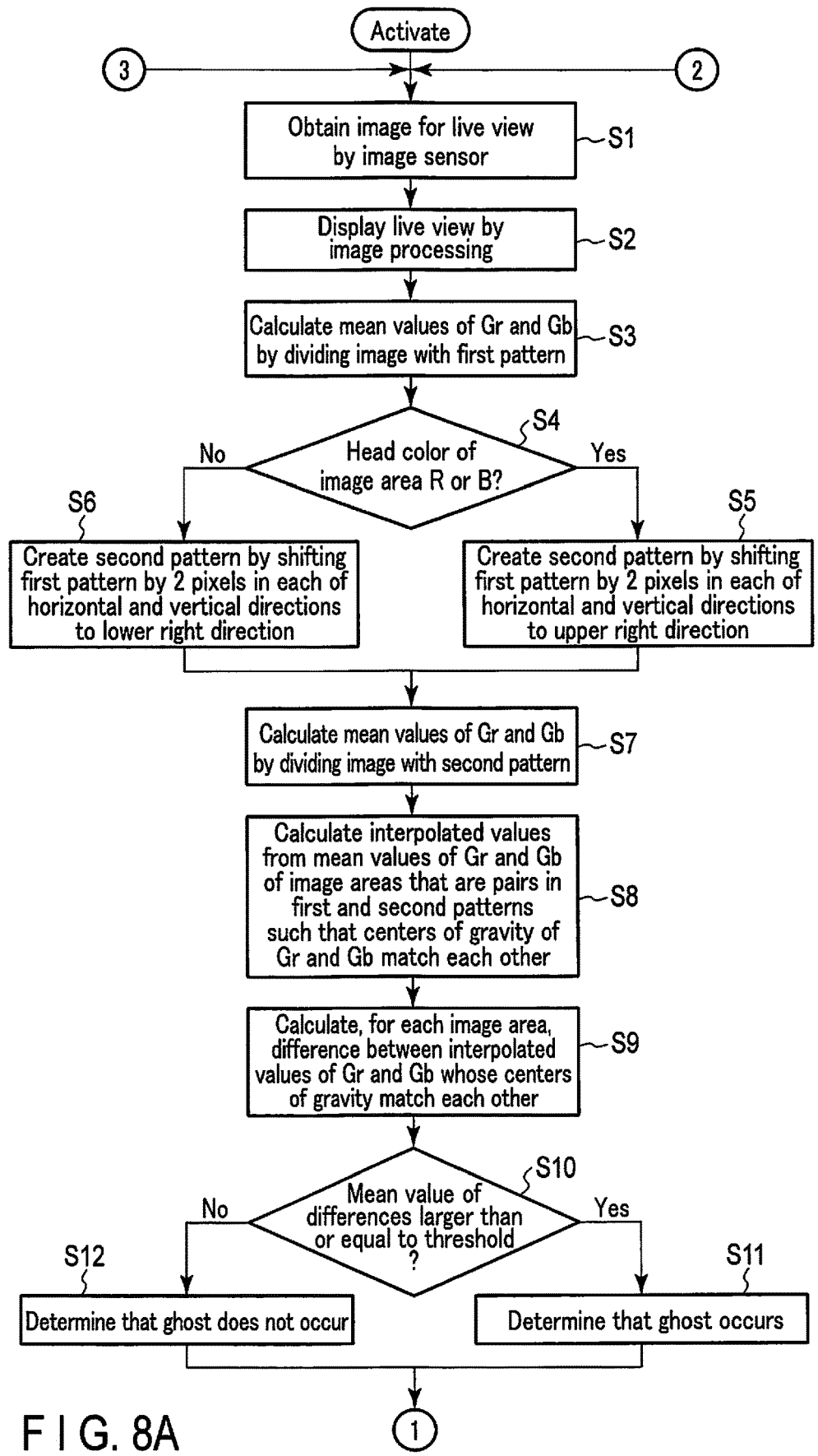
FIG. 8A is a flowchart showing operations of a camera system when a still image is recorded.
Figure 8B:
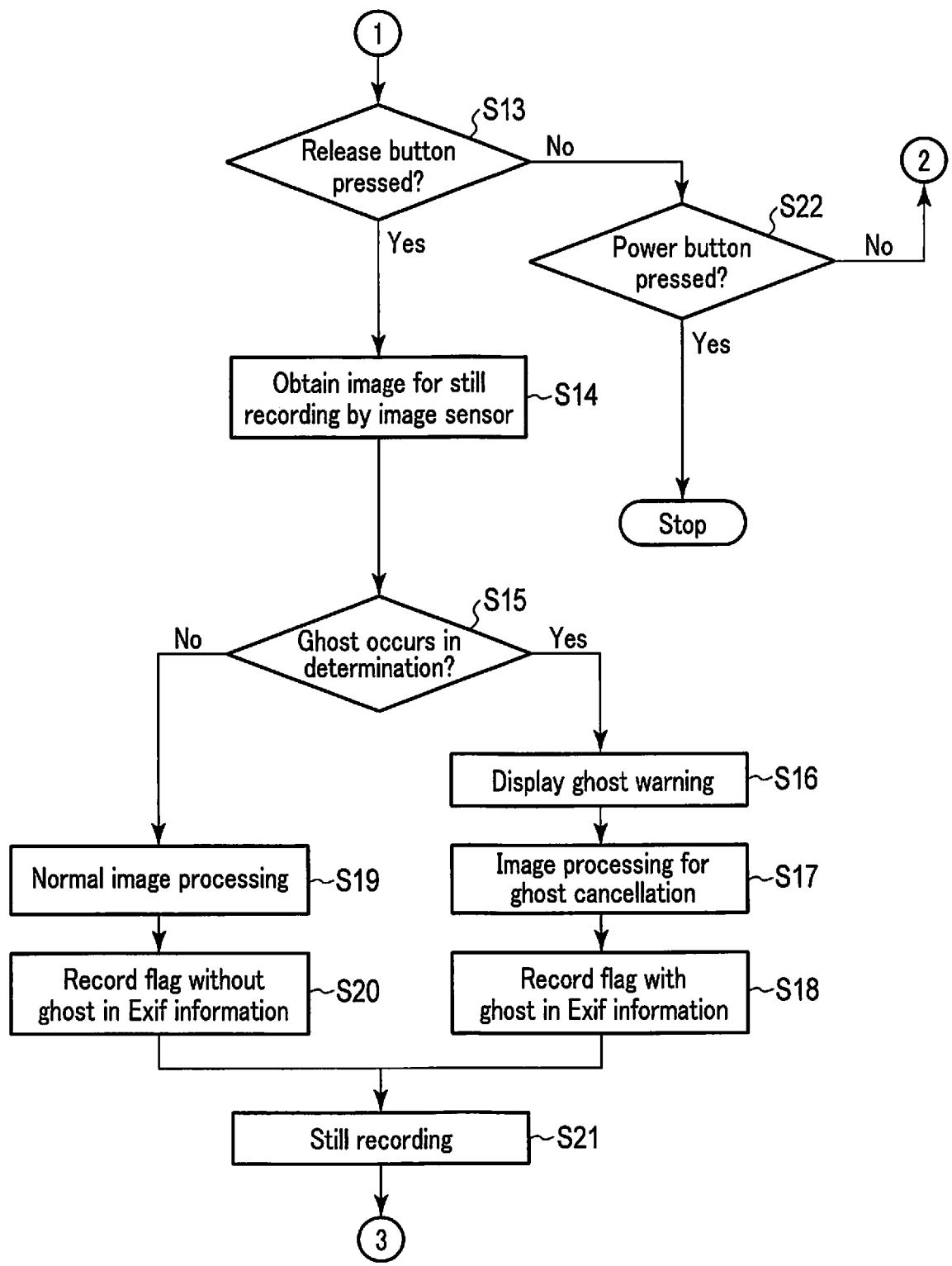
FIG. 8B is a flowchart showing operations of the camera system when a still image is recorded.

Hereinafter, the operations of the imaging apparatus of the present embodiment will be described. FIGS. 8A and 8B are flowcharts showing operations of the camera system 1 when a still image is recorded. The operations of FIGS. 8A and 8B are mainly controlled by the microcomputer 234.

The operations of FIGS. 8A and 8B are started, for example, when the camera body 200 is activated in a still image recording mode. In step S1, the microcomputer 234 drives the image sensor 206 at a predetermined frame rate via the image sensor driver 208 in order to obtain an image for a live view. The image signal obtained by the image sensor 206 is analog processed by the analog processor 210. The image signal analog processed by the analog processor 210 is converted into image data, a digital signal, by the A/D converter 212. The image data obtained by the A/D converter 212 is stored in the SDRAM 216 via the first image processor 222.

In step S2, the microcomputer 234 directs the second image processor 224 to perform basic image processing on the image data obtained by the operations for obtaining the image for a live view. In response to this direction, the second image processor 224 performs the basic image processing on the image data stored in the SDRAM 216 by the basic image processor 2241. The basic image processing herein is image processing required for the display on the display 228, and includes, for example, OB subtraction processing, WB correction processing, demosaic processing, color conversion processing, gamma conversion processing, noise reduction processing, and scaling processing. After the basic image processing, the microcomputer 234 directs the display driver 226 to display the live view. In response to this direction, the display driver 226 inputs the image data to the display 228, the image data having been sequentially obtained via the image sensor 206 and sequentially processed by the second image processor 224. The display 228 displays the live view based on the input image data.

In step S3, the first image processor 222 divides, by the calculation circuit 2221, the image data obtained by the operations for obtaining the image for a live view with the first pattern. Then, the first image processor 222 calculates, for example, the mean value (first value) of the pixel values of Gr pixels and the mean value (second value) of the pixel values of Gb pixels by the calculation circuit 2221, for each image area R1. In step S3, the integrated value of the pixel values of Gr pixels and the integrated value of the pixel values of Gb pixels may be calculated as the first value and the second value, as described above. Alternatively, the processing of step S3 may be performed while the image for a live view is being obtained, that is, while the image data are being input from the A/D converter 212 to the first image processor 222.

In step S4, the first image processor 222 determines whether the head color of the image area R1 is R or B. When it is determined in step S4 that the head color of the image area R1 is R or B, the processing moves to step S5. When it is determined in step S4 that the head color of the image area R1 is not R nor B, that is, is Gr or Gb, the processing moves to step S6.

In step S5, the first image processor 222 creates a second pattern by shifting the first pattern by 2 pixels in each of the horizontal and vertical directions to the upper right direction. In step SG, the first image processor 222 creates a second pattern by shifting the first pattern by 2 pixels in each of the horizontal and vertical directions to the lower right direction. After step S5 or step S6, the processing moves to step S7.

In step S7, the first image processor 222 divides, by the calculation circuit 2221, the image data obtained by the operations for obtaining the image for a live view with the second pattern. Then, the first image processor 222 calculates, for example, the mean value (first value) of the pixel values of Gr pixels and the mean value (second value) of the pixel values of Gb pixels by the calculation circuit 2221, for each image area R2. When the integrated value of the pixel values of Gr pixels and the integrated value of the pixel values of Gb pixels are calculated in step S3, the integrated value of the pixel values of Gr pixels and the integrated value of the pixel values of Gb pixels are calculated also in step S7.

In step S8, the microcomputer 234 performs interpolation operations for each pair of the image areas by the interpolation operating circuit 2341. When the head color of the image area R1 is Gr or B, the interpolation operating circuit 2341 performs the operations of (Equation 1), and when the head color of the image area R1 is R or Gb, it performs the operations of (Equation 2). Thereby, the center of gravity represented by the mean value of the pixel values of Gr pixels and the center of gravity represented by the mean value of the pixel values of Gb pixels match each other.

In step S9, the microcomputer 234 calculates, for each pair of the image areas, the difference (G-step) between the first interpolated value Igr and the second interpolated value Igb, which are obtained by the interpolation operations, by the G-step detecting circuit 2342.

In step S10, the microcomputer 234 determines whether the mean value (or the integrated value) of the differences (G-steps) between the first interpolated values Igr and the second interpolated values Igb calculated for each image area is larger than or equal to a threshold. This threshold is used for determining the presence or absence of a ghost and is appropriately set. When it is determined in step S10 that the mean value of the differences between the first interpolated values Igr and the second interpolated values Igb is larger than or equal to the threshold, the processing moves to step S11. When it is determined in step S10 that the mean value of the differences between the first interpolated values Igr and the second interpolated values Igb is not larger than or equal to the threshold, the processing moves to step S12.

In step S11, the microcomputer 234 determines that a ghost currently occurs, and sets a flag with ghost. In step S12, the microcomputer 234 determines that a ghost does not currently occur, and sets a flag without ghost. After step S11 or step S12, the processing moves to step S13.

In step S13, the microcomputer 234 determines whether a user has pressed the release button. When it is determined in step S13 that the release button has been pressed, the processing moves to step S14. When it is determined in step S13 that the release button has not been pressed, the processing moves to step S22.

In step S14, the microcomputer 234 drives the image sensor 206 via the image sensor driver 208 in order to record a still image. In recording a still image, the image sensor 206 is driven in accordance with the imaging condition (shutter speed value) set by the AE processor 218. The image signal obtained by the image sensor 206 is analog processed by the analog processor 210. The image signal analog processed by the analog processor 210 is converted into image data, a digital signal, by the A/D converter 212. The image data obtained by the A/D converter 212 is stored in the SDRAM 216 via the first image processor 222.

In step S15, the microcomputer 234 determines whether a ghost occurs. This determination is determined by whether the flag with ghost is set. When it is determined in step S15 that a ghost occurs, the processing moves to step S16. When it is determined in step S15 that a ghost does not occur, the processing moves to step S19.

In step S16, the microcomputer 234 makes the display 228 display a warning indicating that a ghost currently occurs in the obtained still image. The warning of step S16 is made, for example, by displaying a message. Herein, the warning does not necessarily have to be displayed on the display 228, and may be displayed on a display different from the display 228. In addition, the warning may be made by a technique other than display.

In step S17, the microcomputer 234 directs the second image processor 224 to perform basic image processing including the image processing for ghost cancellation. In response to this direction, the second image processor 224 performs, by the basic image processor 2241, the basic image processing including the image processing for ghost cancellation on the image data stored in the SDRAM 216. Thereafter, the processing moves to step S18. The basic image processing of step S17 is image processing required for recording a still image on the recording medium 232, and includes, for example, OB subtraction processing, WB correction processing, demosaic processing, color conversion processing, gamma conversion processing, noise reduction processing, scaling processing, and still image compression processing, in addition to the image processing for ghost cancellation.

In the image processing for ghost cancellation, the basic image processor 2241 may be configured to change an image processing parameter in accordance with the size of the G-step. That is, it can be considered that a stronger ghost occurs as the G-step is larger, and hence the image processing parameter may be changed such that an effect of the ghost cancellation is made larger as the G-step is larger.

Also, there is the possibility that a user may intentionally cause a ghost, and hence processing may be provided prior to the processing of step S17, in which a user is caused to select whether to perform image processing for ghost cancellation. In this case, when a user selects to perform the image processing for ghost cancellation, the processing of step S17 is performed. Herein, the image processing for ghost cancellation of step S17 may be omitted.

In step S18, the microcomputer 234 records the flag with ghost in Exif (Exchangeable image file format) information that is additional information on a still image. Thereafter, the processing moves to step S21.

In step S19 after it is determined in step S15 that a ghost does not occur, the microcomputer 234 directs the second image processor 224 to perform the normal basic image processing not including the image processing for ghost cancellation. In response to this direction, the second image processor 224 performs, by the basic image processor 2241, the normal basic image processing not including the image processing for ghost cancellation on the image data stored in the SDRAM 216. Thereafter, the processing moves to step S20. The basic image processing of step S19 is the same as the basic image processing required for recording a still image described in step S17, except for the image processing for ghost cancellation.

In step S20, the microcomputer 234 records the flag without ghost in the Exif information that is additional information on a still image. Thereafter, the processing moves to step S21.

In step S21, the microcomputer 234 generates a still image file by adding the Exif information to the still image on which the image processing has been performed, and records the generated still image file on the recording medium 232 via the memory I/F 230. Thereafter, the processing returns to step S1.

In step S22 after it is determined in step S13 that the release button has not been pressed, the microcomputer 234 determines whether a user has pressed the power button. When it is determined in step S22 that the power button has been pressed, the microcomputer 234 turns off the power supply of the camera body 200. Thereafter, the processing of FIGS. 8A and 8B are ended. When it is determined in step S22 that the power button has not been pressed, the processing returns to step S1.

In the operations shown in FIGS. 8A and 8B, the result of the ghost determination performed when the live view is displayed is used in recording the still image. Thereby, the time required for recording a still image can be shortened. On the other hand, if the time required for recording a still image can be lengthened, the ghost determination may be performed by using the image data for recording the still image itself. In this case, the ghost determination to be performed when the live view is displayed may be omitted.

Figure 9A:
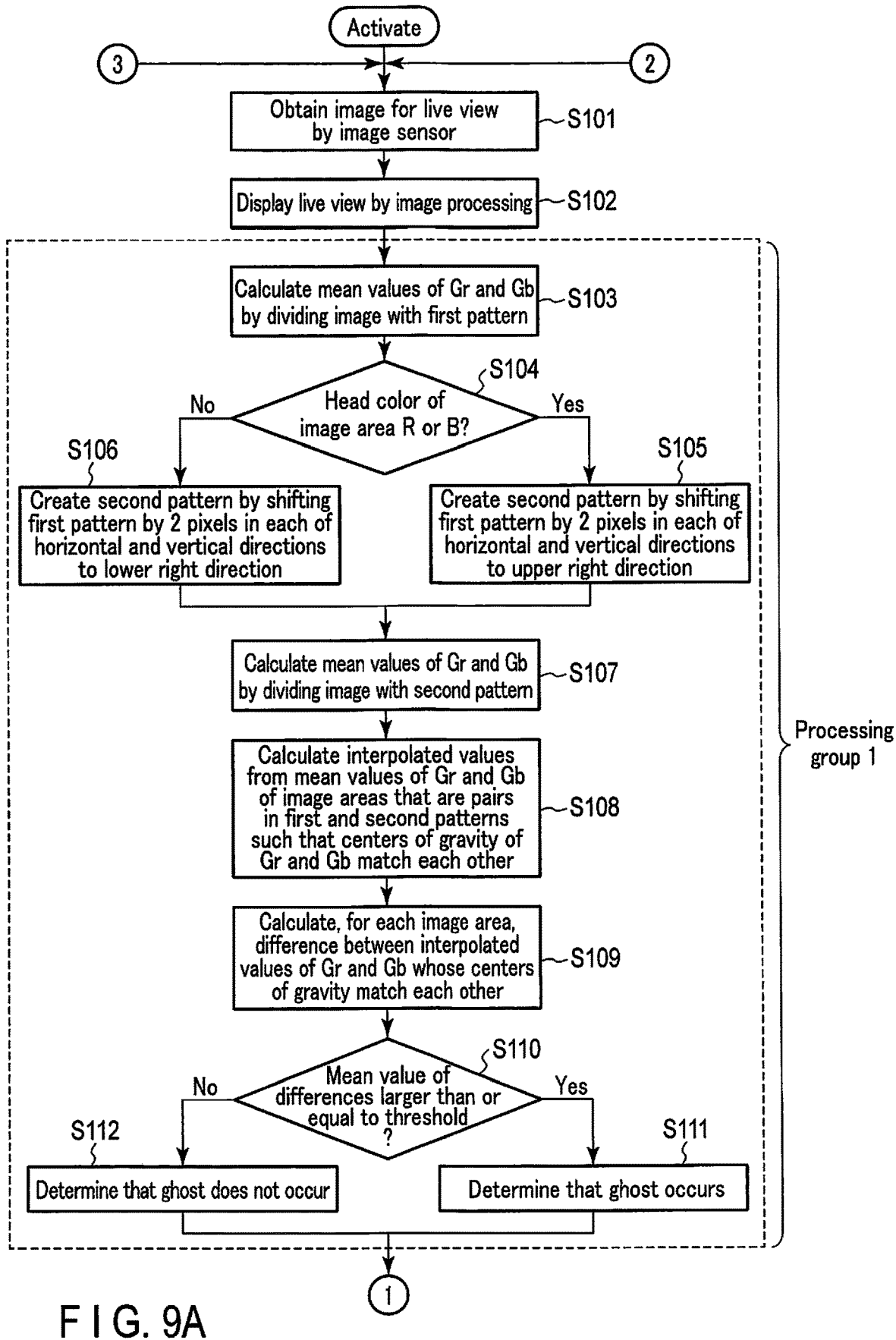
FIG. 9A is a flowchart showing operations of the camera system when a movie image is recorded.
Figure 9B:
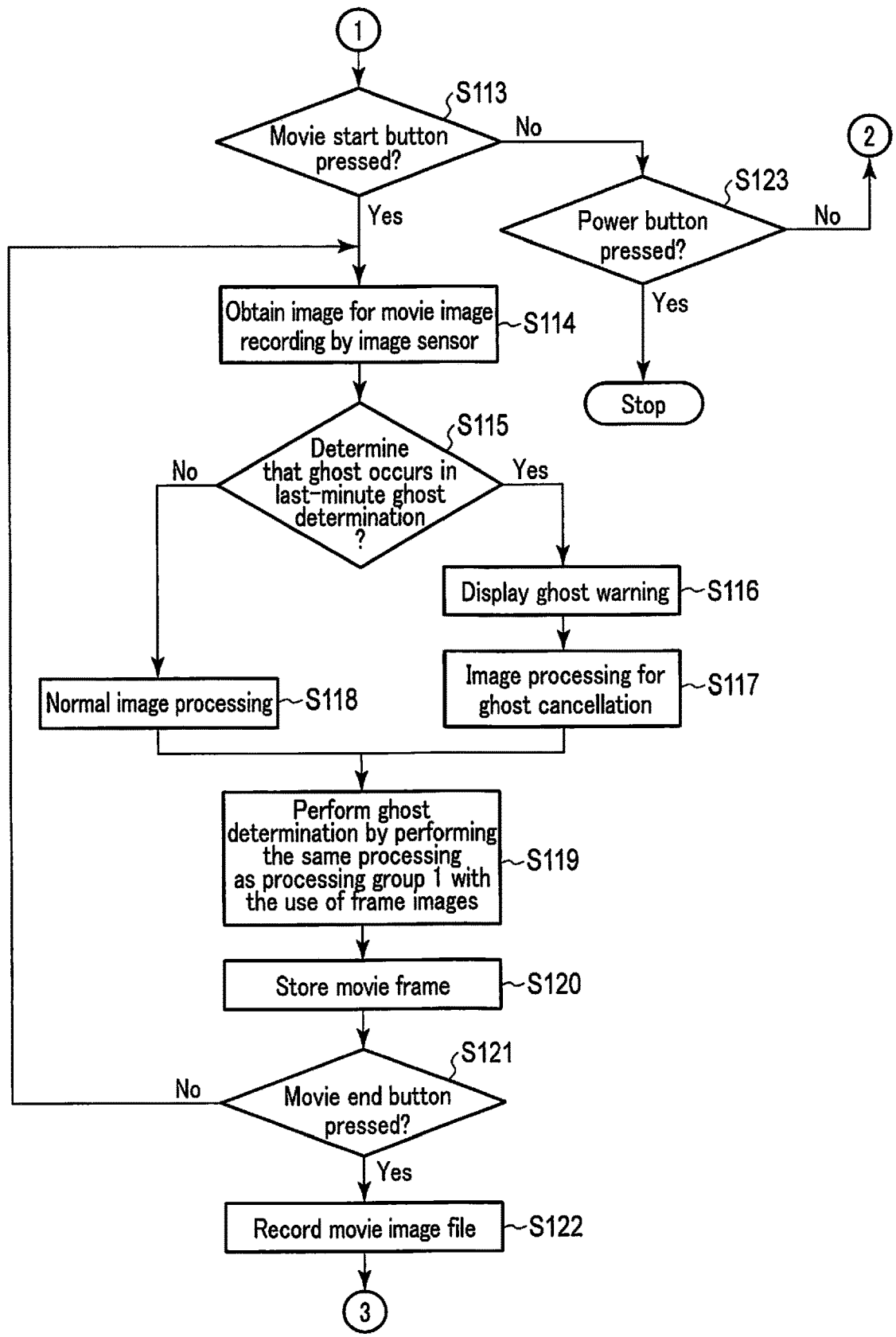
FIG. 9B is a flowchart showing operations of the camera system when a movie image is recorded.

FIGS. 9A and 9B are flowcharts showing operations of the camera system 1 when a movie image is recorded. The operations of FIGS. 9A and 9B are mainly controlled by the microcomputer 234. In FIGS. 9A and 9B, description of the same operations as in FIGS. 8A and 8B will be appropriately omitted.

The operations of FIGS. 9A and 9B are started, for example, when the camera body 200 is activated in a movie image recording mode. In step S101, the microcomputer 234 drives the image sensor 206 at a predetermined frame rate via the image sensor driver 208 in order to obtain an image for a live view.

In step S102, the microcomputer 234 performs processing for displaying the live view. This processing is the same as the processing of step S2 of FIG. 8A. Therefore, description will be omitted.

The processing (processing group 1) shown by steps S103 to S112 are the same as the processing shown by steps S3 to S12 of FIG. 8A. Therefore, description will be omitted. In the present embodiment, ghost determination is also performed when a live view in a movie image recording mode is displayed.

In step S113 after the ghost determination is completed, the microcomputer 234 determines whether a user has pressed the movie start button. When it is determined in step S113 that the movie start button has been pressed, the processing moves to step S114. When it is determined in step S113 that the movie start button has not been pressed, the processing moves to step S123.

In step S114, the microcomputer 234 drives the image sensor 206 via the image sensor driver 208 in order to record a movie frame. In recording a movie image, the image sensor 206 is driven at a predetermined frame rate. The image signal obtained by the image sensor 206 is analog processed by the analog processor 210. The image signal analog processed by the analog processor 210 is converted into image data, a digital signal, by the A/D converter 212. The image data obtained by the A/D converter 212 is stored in the SDRAM 216 via the first image processor 222.

In step S115, the microcomputer 234 determines whether a ghost occurs in the last-minute ghost determination. When it is just after the movie start button is pressed, the last-minute ghost determination means the ghost determination performed when a live view is displayed, and when it is after that time, the last-minute ghost determination means the ghost determination performed while the movie frame before one frame is being generated. The determination in step S115 is determined by whether a flag with ghost is set. In step S115, when it is determined in the last-minute ghost determination that a ghost occurs, the processing moves to step S116. In step S115, when it is determined in the last-minute ghost determination that a ghost does not occur, the processing moves to step S118.

In step S116, the microcomputer 234 makes, for example, the display 228 display a warning indicating that a ghost currently occurs. The warning of step S116 is made, for example, by displaying a message. Herein, the warning does not necessarily have to be displayed on the display 228, and may be displayed on a display different from the display 228. In addition, the warning may be made by a technique other than display.

In step S117, the microcomputer 234 directs the second image processor 224 to perform basic image processing including image processing for ghost cancellation. In response to this direction, the second image processor 224 performs, by the basic image processor 2241, the basic image processing including the image processing for ghost cancellation on the image data stored in the SDRAM 216. Thereafter, the processing moves to step S119. The basic image processing of step S117 is image processing required for recording a movie image on the recording medium 232, and includes, for example, OB subtraction processing, WB correction processing, demosaic processing, color conversion processing, gamma conversion processing, noise reduction processing, scaling processing, and movie image compression processing, in addition to the image processing for ghost cancellation.

In the image processing for ghost cancellation, the basic image processor 2241 may be configured to change an image processing parameter in accordance with the size of the G-step. That is, it can be considered that a stronger ghost occurs as the G-step is larger, and hence the image processing parameter may be changed such that an effect of the ghost cancellation is made larger as the G-step is larger.

Also, there is the possibility that a user may intentionally cause a ghost, and hence processing may be provided prior to the processing of step S117, in which a user is caused to select whether to perform image processing for ghost cancellation. In this case, when a user selects to perform the image processing for ghost cancellation, the processing of step S117 is performed. Alternatively, the image processing for ghost cancellation of step S117 may be omitted.

In step S118 after it is determined in step S115 that a ghost does not occur, the microcomputer 234 directs the second image processor 224 to perform the normal basic image processing not including the image processing for ghost cancellation. In response to this direction, the second image processor 224 performs, by the basic image processor 2241, the normal basic image processing not including the image processing for ghost cancellation on the image data stored in the SDRAM 216. Thereafter, the processing moves to step S119. The basic image processing of step S118 is the same as the basic image processing for recording a movie image, which has been described in step S117, except for the image processing for ghost cancellation.

In step S119, the microcomputer 234 performs the ghost determination shown by the processing group 1. That is, in the movie image recording mode, ghost determination is performed while a movie image is being recorded. Thereby, the information on the presence or absence of a ghost can be updated even while a movie image is being recorded.

In step S120, the microcomputer 234 makes, for example, the SDRAM 216 store the movie frame obtained by the basic image processing.

In step S121, the microcomputer 234 determines whether a user has pressed the movie end button. When it is determined in step S121 that the movie end button has not been pressed, the processing returns to step S114. In this case, processing for generating the next movie frame is performed. When it is determined in step S121 that the movie end button has been pressed, the processing moves to step S122.

In step S122, the microcomputer 234 generates a movie image file from the movie frame stored by the SDRAM 216. Then, the microcomputer 234 records a flag with ghost or a flag without ghost in the header of the generated movie image file. The flag with ghost or the flag without ghost is recorded to be matched, for example, with the frame number of the movie frame. After the movie image file is generated, the microcomputer 234 records the generated movie image file on the recording medium 232 via the memory I/F 230. Thereafter, the processing returns to step S101.

In step S123 after it is determined in step S113 that the movie start button has not been pressed, the microcomputer 234 determines whether a user has pressed the power button. When it is determined in step S123 that the power button has been pressed, the microcomputer 234 turns off the power supply of the camera body 200. Thereafter, the processing of FIGS. 9A and 9B are ended. When it is determined in step S123 that the power button has not been pressed, the processing returns to step S101.

In the operations shown in FIGS. 9A and 9B, the result of the ghost determination performed when the live view is displayed is used just after the movie start button is pressed. Thereby, the time required for recording a movie image can be shortened. On the other hand, when the time required for recording the movie frame can be lengthened, the ghost determination may be performed when every movie frame is generated, by using image data for recording itself. In this case, the ghost determination to be performed when the live view is displayed may be omitted.

In the present embodiment, image data is divided into image area units with a first pattern and a second pattern different from the first pattern in performing ghost determination, and for each image area divided with each pattern, a first value that is the mean value or integrated value of the pixel values of Gr pixels and a second value that is the mean value or integrated value of the pixel values of Gb pixels are calculated, as described above. Then, interpolation operations are performed such that the center of gravity represented by the first value and the center of gravity represented by the second value match each other. Thereby, an influence of the structure of a subject on the first value and the second value can be suppressed. Therefore, the ghost determination can be performed accurately.

In the present embodiment, the second pattern is set in accordance with the head color of the image area created by the division with the first pattern. Thereby, interpolation operations suitable in accordance with the setting of the first pattern can be performed.

[First Variation]

Hereinafter, variations of the present embodiment will be described. In the above embodiment, the calculation circuit is provided in the first image processor 222 that processes the image data from the A/D converter 212. However, the calculation circuit may be provided, for example, in the second image processor 224, or may be provided separately from the first image processor 222 and the second image processor 224. Alternatively, the same function as the calculation circuit may be achieved by the microcomputer 234.

Also, in the above embodiment, the interpolation operating circuit and the G-step detecting circuit are supposed to be performed in the microcomputer 234. However, the interpolation operating circuit and the G-step detecting circuit may be provided separately from the microcomputer 234. The interpolation operating circuit and the G-step detecting circuit may be provided, for example, in the first image processor 222 or in the second image processor 224, or may be provided separately from the first image processor 222 and the second image processor 224.

[Second Variation]

In the above embodiment, the interpolation operations are performed from the first value and the second value for the two image areas R1 and R2. In this case, it is necessary to change the direction to which the image area R2 is to be shifted depending on the head color of the image area R1. Second Variation is an example in which it is unnecessary to determine the direction to which an image area is to be shifted, by using four image areas created by the division with four different patterns.

FIGS. 10A and 10B are views illustrating the positional relationships among four image areas when division is performed with four patterns. Herein, it is assumed that the pixels illustrated in FIG. 10A and the pixels illustrated in FIG. 10B are located at the same positions. As illustrated in FIGS. 10A and 10B, an image area R2 is shifted from an image area R1 to the right direction by 2 pixels, an image area R3 is shifted to the lower direction by 2 pixels, and an image area R4 is shifted to the lower right direction by 2 pixels. Division with four different patterns is performed such that division into image area units is performed in this way. In the case of the division illustrated in FIGS. 10A and 10B, it is unnecessary to change the division patterns for the image areas R2, R3, and R4 depending on the head color of the image area R1. Also, the shift amount of other image areas with respect to the image area R1 may not be 2 pixels, like the case of two image areas.

FIG. 11 is a view illustrating the positional relationship among eight centers of gravity represented by first values and second values obtained in the four image areas. Herein, a center of gravity Gr1 is a center of gravity represented by the first value calculated for the image area R1, and a center of gravity Gb1 is a center of gravity represented by the second value calculated for the image area R1. Similarly, a center of gravity Gr2 is a center of gravity represented by the first value calculated for the image area R2, and a center of gravity Gb2 is a center of gravity represented by the second value calculated for the image area R2. A center of gravity Gr3 is a center of gravity represented by the first value calculated for the image area R3, and a center of gravity Gb3 is a center of gravity represented by the second value calculated for the image area R3. A center of gravity Gr4 is a center of gravity represented by the first value calculated for the image area R4, and a center of gravity Gb4 is a center of gravity represented by the second value calculated for the image area R4. When the centers of gravity Gr1, Gb1, Gr2, Gb2, Gr3, Gb3, Gr4, and Gb4 have the positional relationship as illustrated in FIG. 11, the interpolation operating circuit 2341 performs the following (Equation 3) operations:

$$Igr=(3\times Vgr1+1\times Vgr2+9\times Vgr3+3\times Vgr4)/16$$

$$Igb=(3\times Vgb1+9\times Vgb2+1\times Vgb3+3\times Vgb4)/16 \quad \text{(Equation 3)}$$

Herein, Igr is a first value (a first interpolated value) after the interpolation operation, Vgr1 is the first value for the image area R1, Vgr2 is the first value for the image area R2, Vgr3 is the first value for the image area R3, and Vgr4 is the first value for the image area R4. Igb is a second value (a second interpolated value) after the interpolation operation, Vgb1 is the second value for the image area R1, Vgb2 is the second value for the image area R2, Vgb3 is the second value for the image area R3, and Vgb4 is the second value for the image area R4.

FIG. 12 is a view illustrating movements of the centers of gravity after the interpolation operations are performed in FIG. 11. The position (interpolated position) represented by the first interpolated value Igr obtained by the interpolation operation shown in (Equation 3) is the position of I in FIG. 12. Similarly, the position (interpolated position) represented by the second interpolated value Igb obtained by the interpolation operation shown in (Equation 3) is also the position of I in FIG. 12. That is, the center of gravity represented by the first interpolated value and the center of gravity represented by the second interpolated value match each other.

According to the above-described Second Variation, it is unnecessary to change the division patterns of other image areas depending on the head color of one image area.

[Third Variation]

Figure 13A:
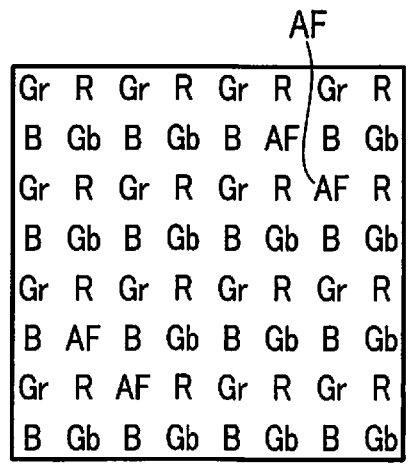
FIG. 13A illustrates an example of an image sensor in which phase difference detection pixels are arranged in the positions of some of Gr pixels and Gb pixels.
Figure 13B:
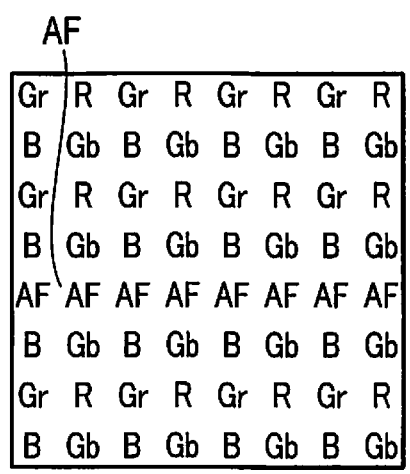
FIG. 13B illustrates an example of an image sensor in which phase difference detection pixels are arranged in a certain pixel line.

Recent image sensors may have a phase difference detection pixel. The phase difference detection pixel is, for example, a pixel whose partial area is shaded such that a phase difference can be detected. How to arrange the phase difference detection pixel is changed depending on which position of a screen a focus state is detected at. FIG. 13A illustrates an example of an image sensor in which the phase difference detection pixels AF are arranged, for example, at the positions of some of Gr pixels and Gb pixels. FIG. 13B illustrates an example of an image sensor in which the phase difference detection pixels AF are arranged in a certain pixel line.

When the same amount of light is incident, the phase difference detection pixel and a normal pixel that is not the phase difference detection pixel respectively output image signals different from each other. Therefore, if the phase difference detection pixel is used for the ghost determination, the difference between the image signals of the phase difference detection pixel and a normal pixel appears as a G-step. If the ghost determination is performed by such a G-step, incorrect determination is caused.

Therefore, when the phase difference detection pixel is arranged at the position of the Gr pixel or Gb pixel in an image area, the first value or second value is calculated by excluding the pixel value of the phase difference detection pixel, in Third Variation. Thereby, the accuracy of the ghost determination can be further increased.

Although the phase difference detection pixel has been described as an example of a pixel different from a normal pixel in Third Variation, the technique of Third Variation can be applied to pixels of various structures that output different pixel signals from normal pixels.

[Other Variations]

In the above embodiment, a camera system such as a digital camera has been described as an application example of the imaging apparatus. On the other hand, the technique of the present embodiment can be applied to various imaging apparatuses having a solid-state image sensor with Bayer array structure. The technique of the present embodiment can also be applied to various imaging apparatuses such as, for example, an endoscope, a microscope, and a surveillance camera. Further, the ghost determination in the present embodiment can be performed when image data is obtained via a solid-state image sensor with Bayer array structure. Therefore, the technique of the present embodiment can also be applied to an image processing apparatus that does not have an image sensor and to which the image data obtained via a solid-state image sensor with Bayer array structure is to be input.

Furthermore, each processing in the above embodiment can also be stored as an image processing program that the microcomputer 234 can execute. In addition, the each processing can be distributed by storing on a storage medium of an external storage apparatus, such as a magnetic disk, an optical disc, or a semiconductor memory. The microcomputer 234 can perform the above processing by reading the image processing program stored in the storage medium of the external storage apparatus so that operations are controlled by the loaded image processing program.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus comprising a solid-state image sensor with Bayer array structure in which a first line, where red pixels and first green pixels are alternately arranged in a horizontal direction, and a second line, where blue pixels and second green pixels are alternately arranged in the horizontal direction, are alternately arranged in a vertical direction, and where the second green pixels have the same characteristics as the first green pixels, the imaging apparatus comprising:
a calculation circuit configured to calculate a first value and a second value, for each of a plurality of predetermined image areas of image data output from the solid-state image sensor, the first value being a mean value or integrated value of pixel values of the first green pixels for a given one of the plurality of predetermined image areas, the second value being a mean value or integrated value of pixel values of the second green pixels for the given one of the plurality of predetermined image areas;

an interpolation operating circuit configured to perform, for the plurality of predetermined image areas, an interpolation operation by using the first values and the second values, the interpolation operation generating a first interpolated value corresponding to the first values and a second interpolated value corresponding to the second values, wherein a first center of gravity represented by the first interpolated value and a second center of gravity represented by the second interpolated value match each other; and a G-step detecting circuit configured to calculate a difference between the first interpolated value and the second interpolated value.

2. The imaging apparatus according to claim 1, wherein the calculation circuit calculates, for two of the plurality of predetermined image areas whose positions are apart from each other by 2 pixels in each of the horizontal and vertical directions, two of the first values and two of the second values.

3. The imaging apparatus according to claim 2, wherein the calculation circuit determines a direction to which one of the two of the plurality of predetermined image areas is to be shifted in accordance with a head color of the other of the two image areas.

4. The imaging apparatus according to claim 1, wherein the calculation circuit calculates, for four of the plurality of predetermined image areas, four of the first values and four of the second values, and from a first of the four of the plurality of image areas, a second of the four of the plurality of image areas is shifted by 2 pixels in the horizontal direction, a third of the four of the plurality of image areas is shifted by 2 pixels in the vertical direction, and a fourth of the four of the plurality of image areas is shifted by 2 pixels in each of the horizontal and vertical directions.

5. The imaging apparatus according to claim 1, wherein the calculation circuit calculates the first value and the second value by excluding a different pixel, the different pixel being different from a normal first green pixel exists at a position of the first green pixel or a normal second green pixel exists at a position of the second green pixel in the image area.

6. The imaging apparatus according to claim 1, further comprising:

a ghost determination circuit configured to determine whether or not a ghost is present based on the difference.

7. An image processing apparatus comprising:

a calculation circuit configured to calculate a first value and a second value, for each of a plurality of predetermined image areas of image data output from a solid-state image sensor with Bayer array structure in which a first line, where red pixels and first green pixels are alternately arranged in a horizontal direction, and a second line, where blue pixels and second green pixels are alternately arranged in the horizontal direction, are alternately arranged in a vertical direction, wherein the second green pixels have the same characteristics as the first green pixels, the first value being a mean value or integrated value of pixel values of the first green pixels for a given one of the plurality of predetermined image areas and the second value being a mean value or integrated value of pixel values of the second green pixels for a given one of the plurality of predetermined image areas;

an interpolation operating circuit configured to perform, for the plurality of predetermined image areas, an interpolation operation by using a plurality of the first values and a plurality of the second values, the interpolation operation generating a first interpolated value corresponding to the first values and a second interpolated value corresponding to the second values, wherein a first center of gravity represented by each of the first interpolated value and a second center of gravity represented by each of the second interpolated value match each other; and a G-step detecting circuit configured to calculate a difference between the first interpolated value and the second interpolated value.

8. The image processing apparatus according to claim 7, wherein the calculation circuit calculates, for two of the plurality of predetermined image areas whose positions are apart from each other by 2 pixels in each of the horizontal and vertical directions, two of the first values and two of the second values.

9. The image processing apparatus according to claim 7, further comprising:

a ghost determination circuit configured to determine whether or not a ghost is present based on the difference.

10. An image processing method comprising:

calculating a first value and a second value, for each of a plurality of predetermined image areas of image data output from a solid-state image sensor with Bayer array structure in which a first line, where red pixels and first green pixels are alternately arranged in a horizontal direction, and a second line, where blue pixels and second green pixels are alternately arranged in the horizontal direction, are alternately arranged in a vertical direction, where the second green pixels have the same characteristics as the first green pixels, the first value being a mean value or integrated value of pixel values of the first green pixels for a given one of the plurality of predetermined image areas and the second value being a mean value or integrated value of pixel values of the second green pixels for the given one of the plurality of predetermined image areas;

performing an interpolation operation by using a plurality of the first values and a plurality of the second values calculated for the plurality of predetermined image areas, wherein a first center of gravity represented by the first interpolated value and a second center of gravity represented by the second interpolated value match each other; and calculating a difference between the first interpolated value and the second interpolated value.

11. The image processing method according to claim 10, wherein the calculating the first value and the second value includes calculating, for two of the plurality of predetermined image areas whose positions are apart from each other by 2 pixels in each of the horizontal and vertical directions, two of the first values and two of the second values.

12. The image processing method according to claim 10, further comprising:

determining whether or not a ghost is present based on the difference.

13. A computer readable recording medium that records an image processing program for causing a computer to execute:

calculating a first value and a second value, for each of a plurality of predetermined image areas of image data output from a solid-state image sensor with Bayer array structure in which a first line, where red pixels and first green pixels are alternately arranged in a horizontal direction, and a second line, where blue pixels and second green pixels are alternately arranged in the horizontal direction, are alternately arranged in a vertical direction, where the second green pixels have the same characteristics as the first green pixels, the first value being a mean value or integrated value of pixel values of the first green pixels for a given one of the plurality of predetermined image areas and the second value being a mean value or integrated value of pixel values of the second green pixels for the given one of the plurality of predetermined image areas;

performing an interpolation operation by using a plurality of the first values and a plurality of the second values calculated for the plurality of predetermined image areas, wherein a first center of gravity represented by the first interpolated value and a second center of gravity represented by the second interpolated value match each other; and calculating a difference between the first interpolated value and the second interpolated value.

14. The recording medium according to claim 13, wherein the calculating the first value and the second value includes calculating, for two of the plurality of predetermined image areas whose positions are apart from each other by 2 pixels in each of the horizontal and vertical directions, two of the first values and two of the second values.

15. The computer readable recording medium of claim 13 that records an image processing program for causing a computer to further execute:

determining whether or not a ghost is present based on the difference.

\* \* \* \* \*